(12) United States Patent
Shetney et al.

(10) Patent No.: US 9,109,495 B2
(45) Date of Patent: Aug. 18, 2015

(54) METHOD AND SYSTEM FOR IDENTIFYING A SOURCE OF NITROGEN OXIDE REDUCTION INEFFICIENCY

(71) Applicant: GM GLOBAL TECHNOLOGY OPERATIONS LLC, Detroit, MI (US)

(72) Inventors: Justin Adam Shetney, Livonia, MI (US); Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 26 days.

(21) Appl. No.: 13/961,939

(22) Filed: Aug. 8, 2013

(65) Prior Publication Data

US 2015/0040543 A1 Feb. 12, 2015

(51) Int. Cl.
*F01N 11/00* (2006.01)
*F01N 13/00* (2010.01)
*B01D 53/94* (2006.01)
*F01N 3/20* (2006.01)

(52) U.S. Cl.
CPC .......... *F01N 11/002* (2013.01); *B01D 53/9495* (2013.01); *F01N 3/208* (2013.01); *F01N 13/0093* (2013.01); *F01N 2550/02* (2013.01); *F01N 2560/026* (2013.01); *F01N 2560/06* (2013.01); *F01N 2560/14* (2013.01); *F01N 2610/02* (2013.01); *F01N 2900/1602* (2013.01); *F01N 2900/1621* (2013.01)

(58) Field of Classification Search
CPC .............. F01N 11/002; F01N 13/0093; F01N 2550/02; F01N 2560/026; F01N 2560/06; F01N 2560/14; F01N 2610/02; F01N 2900/1602; F01N 2900/1621; F01N 3/208
USPC .................................. 60/274, 276, 277, 301
See application file for complete search history.

(56) References Cited

U.S. PATENT DOCUMENTS

| | | | | |
|---|---|---|---|---|
| 2005/0103000 A1* | 5/2005 | Nieuwstadt et al. | ............ | 60/286 |
| 2011/0023591 A1* | 2/2011 | Dobson et al. | ............ | 73/114.75 |
| 2012/0192549 A1* | 8/2012 | Sakurai | ........................... | 60/285 |

* cited by examiner

*Primary Examiner* — Thomas Denion
*Assistant Examiner* — Jorge Leon, Jr.
(74) *Attorney, Agent, or Firm* — Quinn Law Group, PLLC

(57) ABSTRACT

System and methods can identify a source of nitrogen oxide reduction inefficiency in an exhaust system including first and second selective catalytic reduction (SCR) catalysts connected in series along an exhaust line. The methods and systems can determine which of the first and second SCR catalysts is a source of nitrogen oxide reduction inefficiency based on the temperatures of the exhausts gases flowing through the first and second SCR catalysts.

17 Claims, 2 Drawing Sheets

METHOD AND SYSTEM FOR IDENTIFYING A SOURCE OF NITROGEN OXIDE REDUCTION INEFFICIENCY

TECHNICAL FIELD

The present disclosure relates to a method and system for identifying a source of nitrogen oxide reduction inefficiency.

BACKGROUND

During a combustion cycle of an internal combustion engine (ICE), air/fuel mixtures are provided in cylinders of the ICE. The air/fuel mixtures are compressed and combusted to provide output torque. After combustion, pistons of the ICE force exhaust gases in the cylinders out through exhaust valve openings and into an exhaust system. The exhaust gases may contain nitrogen oxides ($NO_x$), carbon monoxide (CO) and hydrocarbons (HCs). An exhaust gas treatment system of the ICE may include one or more selective catalytic reduction (SCR) catalysts to reduce exhaust emissions. The SCR catalysts can be used to reduce NOx in the exhaust system. Specifically, an SCR catalyst converts $NO_x$ into nitrogen $N_2$ and water ($H_2O$).

SUMMARY

The present disclosure relates to methods of identifying a source of nitrogen oxide reduction inefficiency in an exhaust system of a vehicle. The exhaust system includes an exhaust line, first and second selective catalytic reduction (SCR) catalysts connected in series along the exhaust line, and a diesel exhaust fluid (DEF) dosing system configured to inject DEF into the exhaust line. Each of the first and second SCR catalysts is configured to convert nitrogen oxides into nitrogen and water.

In an embodiment, the method includes the following steps: (a) determining a first temperature of exhaust gases entering the first SCR catalyst; (b) determining a second temperature of exhaust gases entering the second SCR catalyst; (c) determining a nitrogen oxides concentration in the exhaust gases exiting the second SCR catalyst; (d) determining a nitrogen oxides concentration in the exhaust gases entering the first SCR catalyst; (e) determining a nitrogen oxide conversion efficiency of the exhaust system based on the nitrogen oxides concentration in the exhaust gases exiting the second SCR catalyst and the nitrogen oxides concentration in the exhaust gases entering the first SCR catalyst; (f) comparing the nitrogen oxides conversion efficiency to a nitrogen oxides conversion efficiency threshold value; and (g) if the nitrogen oxides conversion efficiency is less than the nitrogen oxides conversion efficiency threshold value, then determining which of the first and second SCR catalysts is a source of nitrogen oxide reduction inefficiency based on the first and second temperatures.

The present disclosure also relates to exhaust systems. In an embodiment, the exhaust system includes an exhaust line configured to convey exhaust gases, a first selective catalytic reduction (SCR) catalyst configured to convert nitrogen oxide in the exhaust gases into nitrogen and water, and a second SCR catalyst configured to convert nitrogen oxide in the exhaust gases into nitrogen and water. The first and second SCR catalysts are connected in series along the exhaust line. In addition, the exhaust system includes a first temperature sensor configured to measure the temperature of the exhaust gases entering the first SCR catalyst to determine a first temperature. The first temperature sensor is configured to generate a first temperature signal indicative of the first temperature. The exhaust system further includes a second temperature sensor configured to measure the temperature of the exhaust gases entering the second SCR catalyst to determine a second temperature. The second temperature sensor is configured to generate a second temperature signal indicative of the second temperature. The exhaust system further includes a control module in communication with the first and second temperature sensors. Further, the control module is programmed and configured to perform the following functions: (a) receive the first and second temperature signals; (b) determine a nitrogen oxides concentration in the exhaust gases exiting the second SCR catalyst; (c) determine a nitrogen oxides concentration in the exhaust gases entering the first SCR catalyst; (d) determine a nitrogen oxide conversion efficiency of the exhaust system based on the nitrogen oxides concentration in the exhaust gases exiting the second SCR catalyst and the nitrogen oxides concentration in the exhaust gases entering the first SCR catalyst; (e) compare the nitrogen oxides conversion efficiency to a nitrogen oxides conversion efficiency threshold value; and (f) determine which of the first and second SCR catalysts is a source of nitrogen oxide reduction inefficiency based on the first and second temperatures if the nitrogen oxides conversion efficiency is less than the nitrogen oxides conversion efficiency threshold value.

The present disclosure also relates to vehicles such as cars and trucks. In an embodiment, the vehicle includes a diesel internal combustion engine configured to produce exhaust gases and an exhaust line coupled to the internal combustion engine and configured to receive exhaust gases from the internal combustion engine. The vehicle further includes an exhaust system as described above.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
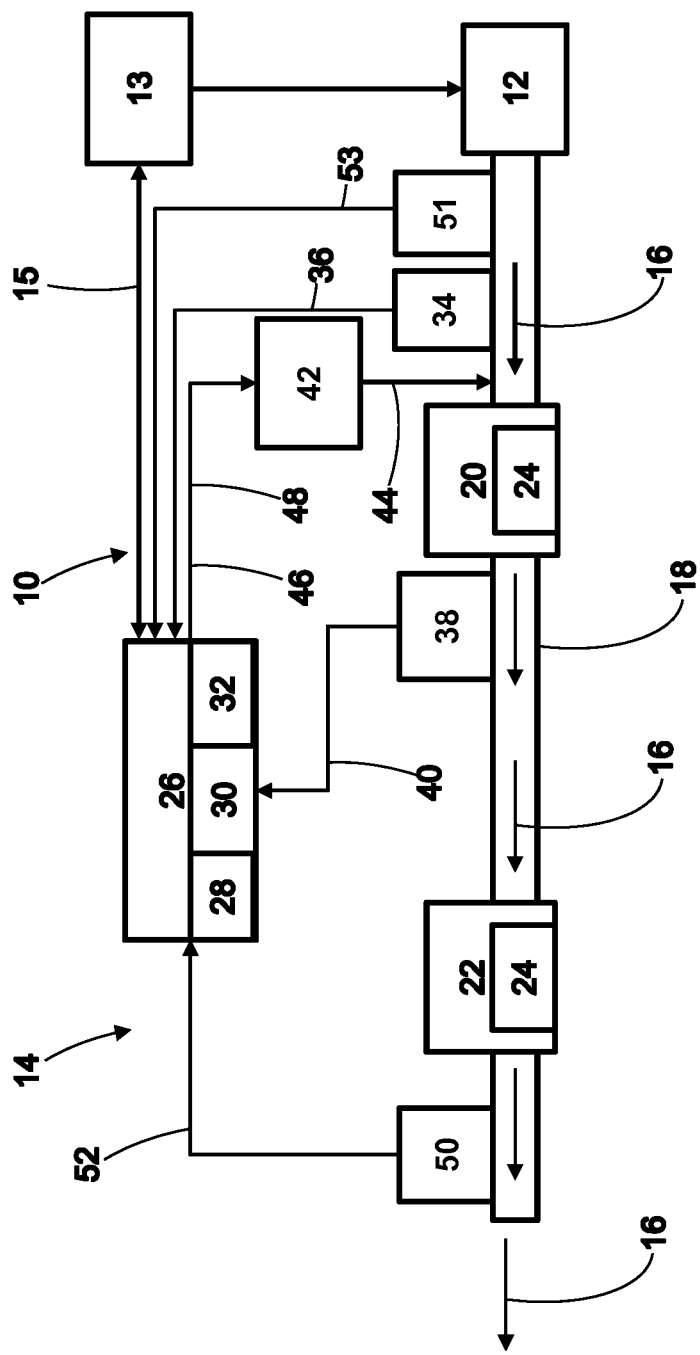
FIG. 1 is block diagram of a portion of a vehicle including an internal combustion engine and an exhaust system that includes a DEF delivery system.

Referring to the figures, wherein like reference numbers refer to like components throughout the several views, FIG. 1 schematically illustrates a vehicle 10 including a diesel internal combustion engine 12, an ignition system 13, and an exhaust system 14 in fluid communication with the internal combustion engine 12. The ignition system 13 is connected to the engine 12 and allows the engine 12 to start when directed by an operator. For example, the operator may start the engine 12 with an ignition key. During ignition, the engine 12 combusts an air/fuel mixture to produce output torque and propel the vehicle 10. During combustion, the engine 12 generates exhaust gases 16 that flow into the exhaust system 14. The exhaust gases 16 may include nitrogen oxides ($NO_x$). As used herein, the singular and plural forms of the term "nitrogen oxides" includes, but is not limited to, nitrogen monoxide, nitrogen dioxide, and a combination thereof. It is desirable to lower the concentration of nitrogen oxides in the exhaust gases 16 before releasing the exhaust gases 16 to the atmosphere. To do so, the vehicle 10 includes the exhaust system 14, which among other things, can reduce the nitrogen oxides concentration in the exhaust gases 16.

The exhaust system 14 includes an exhaust line 18 configured to receive exhaust gases 16 from the engine 12. The exhaust line 18 may be part of an exhaust manifold and may be configured as a pipe, tube, duct, or any other suitable conduit capable of conveying the exhaust gases 16 from the engine 12. In addition to the exhaust line 18, the exhaust system 14 includes first or upstream selective catalytic reduction (SCR) catalyst 20 and a second or downstream SCR catalyst 22 connected in series along the exhaust line 18. Each of the first and second SCR catalysts 20, 22 stores an ammonia-based reductant 24, such as ammonia ($NH_3$), and can convert nitrogen oxides nitrogen oxides of variable rate concentration into nitrogen and water (i.e., nitrogen oxides reduction). Specifically, the ammonia-based reductant 24 stored in the first and second SCR catalyst is used to convert the nitrogen oxides into the nitrogen and water. Accordingly, the first and second SCR catalysts 20, 22 effectively reduce the nitrogen oxides in the exhaust system 14. The first SCR catalyst 20 may be a two-way SCR catalyst such as Selective Catalytic Reduction Filter (SCRF). The SCRF combines the SCR function within the wall of a high porosity particulate filter substrate. The second SCR catalyst 22 may be an underfloor SCR catalyst.

Aside from the SCR catalysts 20, 22, the exhaust system 14 may include a control module 26 for controlling the operation of the exhaust system 14. The control module 26 may be an SCR control module or an engine control module (ECM) and may be a microprocessor-based device having one or more processors 28, tangible, non-transitory memory 30 including but not necessarily limited to read only memory (ROM), random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers 32, and the necessary input/output (I/O) devices and other signal conditioning and/or buffer circuitry. As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term "module" may include memory (shared, dedicated, or group) that stores code executed by the processor. The term "a code," as used above, may include software, firmware, and/or microcode, and may refer to programs, routines, functions, classes, and/or objects. The term "shared," as used above, means that some or all code from multiple modules may be executed using a single (shared) processor. In addition, some or all code from multiple modules may be stored by a single (shared) memory. The term "group," as used above, means that some or all code from a single module may be executed using a group of processors. In addition, some or all code from a single module may be stored using a group of memories.

The control module 26 may receive inputs from several sensors or systems. For example, the control module 26 may receive an input signal from the ignition system 13 indicating that the engine 12 has performed a cold start (i.e., the cold start signal 15). The engine 12 performs a cold start when the engine 12 has not been operating prior to starting the internal combustion engine 14, and/or when an operating temperature of the exhaust gas 12 is less than about 150 degrees Celsius. The exhaust system 14 may include a first temperature sensor 34 in communication with the control module 26. The first temperature sensor 34 may be a thermocouple or thermistor and can monitor and measure the temperature of the exhaust gases 16 flowing into the first SCR catalyst 20 (hereinafter referred to as "the first temperature T1"). Upon measuring the first temperature T1, the first temperature sensor 34 generates an input signal (i.e., the first temperature signal 36) indicative of the temperature of the exhaust gases 16 entering the first SCR catalyst 20 and sends the first temperature signal 36 to the control module 26. The control module 26 can receive the first temperature signal 36 from the first temperature sensor 34 and stores the first temperature T1 as sensed by the first temperature sensor 34 in the memory 30. Alternatively, rather than using the first temperature sensor 34, the first temperature T1 may be obtained from a model executed by the control module 26.

The exhaust system 14 further includes a second temperature sensor 38 in communication with the control module 26. The second temperature sensor 38 may be a thermocouple or thermistor and can monitor and measure the temperature of the exhaust gases 16 entering into the second SCR catalyst 22 (hereinafter referred to as the second temperature T2). Specifically, the second temperature sensor 38 can measure the temperature of the exhaust gases 16 entering into the second SCR catalyst 22 after those exhaust gases 16 have passed through first SCR catalyst 20. In other words, the second temperature sensor 38 monitors and measures the temperature of the exhaust gases 16 between the first and second SCR catalysts 20, 22. The second temperature T2 is therefore the temperature of the exhaust gases 16 downstream of the first SCR catalyst 20 and upstream of the second SCR catalyst 22. In operation, the second temperature sensor 38 generates an input signal (i.e., the second temperature signal 40) indicative of the second temperature T2. The control module 26 can receive the second temperature signal 40 and, in response, stores the second temperature T2 in the memory 30. Alternatively, rather than using the second temperature sensor 38, the second temperature T2 may be obtained from a model executed by the control module 26.

The exhaust system 14 additionally includes a Diesel Exhaust Fluid (DEF) dosing system 42 controlled by the control module 26. The DEF dosing system 42 can inject DEF 44 into the exhaust line 18 upon receiving a signal from the control module 26. The DEF 44 may be an aqueous urea solution. The control module 26 can send an activation signal 46 to the DEF dosing system 42 to activate the DEF dosing system 42. Upon activation, the DEF dosing system 42 injects DEF into the exhaust line 18. Conversely, the control module 26 can send a deactivation signal 48 to the DEF dosing system 42 to disable the DEF dosing system 42. In response to the deactivation signal 48, the DEF dosing system 42 is disabled and thereby stops injecting DEF 44 to the exhaust line 18. The DEF dosing system 42 may inject DEF 44 into the exhaust line 18 upstream of the first SCR catalyst 20. That is, upon direction by the control module 26, the DEF dosing system 42 can inject DEF 44 into the exhaust line 18 at a location between the engine 12 and the first SCR catalyst 20 (i.e., upstream of the first SCR catalyst 20).

In addition to the DEF dosing system 42, the exhaust system 14 includes a first nitrogen oxide sensor 50 capable of measuring nitrogen oxides concentration in the exhaust gases 16. In the depicted embodiment, the first nitrogen oxide sensor 50 is disposed along the exhaust line 18 and downstream of the second SCR catalyst 22. Accordingly, the first nitrogen oxide sensor 50 can measure the nitrogen oxides concentration in the exhaust gases 16 that have already passed through the second SCR catalyst 22. To this end, the first nitrogen oxide sensor 50 is disposed along the exhaust line 18 at a location downstream of the second SCR catalyst 22. In the depicted embodiment, no nitrogen oxide sensor is disposed at a location that is: (1) downstream of the first SCR catalyst 20 and (2) upstream of the second SCR catalyst 22. In other words, the exemplary exhaust system 14 does not include a nitrogen oxide sensor that can measure the nitrogen oxides concentration of the exhaust gases 16 after the exhaust gases 16 have passed through the first SCR catalyst 20 but before the exhaust gases 16 enter the second SCR catalyst 22. The exhaust system 14 may include one nitrogen oxide sensor and, in such a case, the first nitrogen oxide sensor 50 may be simply referred to as the nitrogen oxide sensor.

The exhaust system 14 may additionally include a second nitrogen oxide sensor 51 capable of measuring nitrogen oxides concentration in the exhaust gases 16. In the depicted embodiment, the second nitrogen oxide sensor 51 is disposed along the exhaust line 18 and upstream of the first SCR catalyst 20. Specifically, the second nitrogen oxide sensor 51 is disposed downstream of the engine 12 and upstream of the first SCR catalyst 20. Accordingly, the second nitrogen oxide sensor 51 can measure the nitrogen oxide concentration in the exhaust gases 16 before the exhaust gases 16 enter the first SCR catalyst 20 and after the exhaust gases 16 exit the engine 12. In other words, the second nitrogen oxide sensor 51 can measure the nitrogen oxides concentration in the exhaust gases 16 entering the first SCR catalyst 20. Alternatively, rather than using the second nitrogen sensor 51, the nitrogen oxides concentration in the exhaust gases 16 entering the first SCR catalyst 20 may be obtained from a model executed by the control module 26.

The control module 26 can communicate with the first and second nitrogen oxide sensors 50, 51 and can therefore store information relating to the nitrogen oxides concentration received from the first and second nitrogen oxide sensors 50, 51. Specifically, the first nitrogen oxide sensor 50 can send an input signal indicating the nitrogen oxides concentration in the exhaust gases 16 downstream of the second SCR catalyst 22 (i.e., the first nitrogen oxides concentration signal 52) to the control module 26. Upon receiving the first nitrogen oxides concentration signal 52, the control module 26 stores the measured nitrogen oxides concentration in the memory 30. The second nitrogen oxide sensor 51 can send an input signal indicating the nitrogen oxides concentration in the exhaust gases 16 upstream of the first SCR catalyst 20 (i.e., the second nitrogen oxides concentration signal 53) to the control module 26. Upon receiving the second nitrogen oxides concentration signal 53, the control module 26 stores the measured nitrogen oxides concentration in the memory 30.

As discussed above, the SCR catalysts 20, 22 convert nitrogen oxides into nitrogen and water. However, sometimes SCR catalysts may malfunction and consequently exhibit inefficient nitrogen oxide conversion. It is therefore desirable to identify malfunctioning SCR catalysts to replace or fix them.

Figure 2:
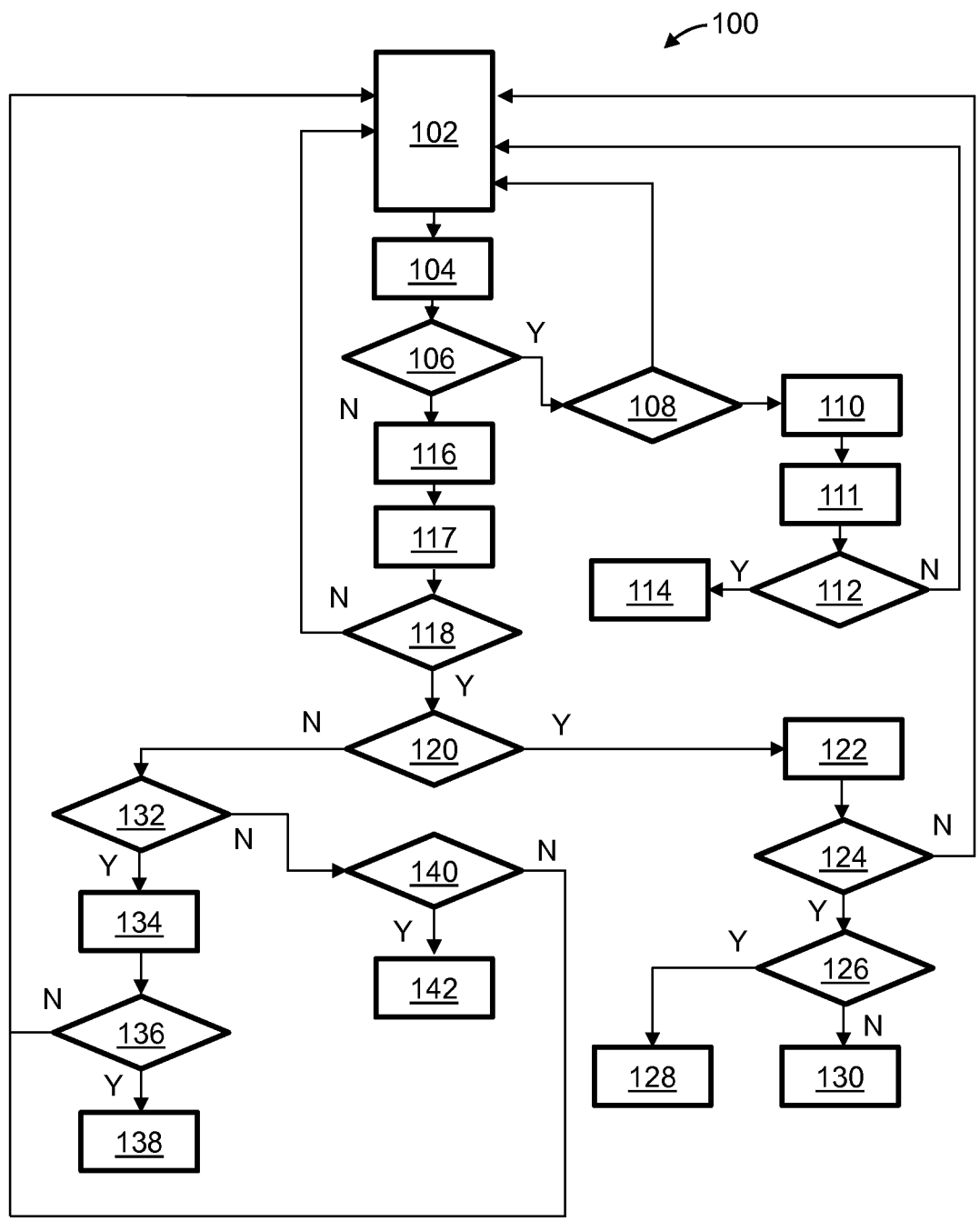
FIG. 2 is a flow chart of a method of identifying a selective catalytic reduction catalyst exhibiting inefficient nitrogen oxide reduction in the exhaust system.

FIG. 2 illustrates a flowchart of a method 100 of identifying a source of nitrogen oxides reduction inefficiency in the exhaust system 14. Specifically, the steps of the method 100 may be part of a computer program stored in the memory 30 and executed by the processor 28. The method 100 can be used to identify an SCR catalyst 20 or 22 exhibiting inefficient nitrogen oxide conversion. The method 100 begins at step 102. Step 102 entails determining the temperature of the exhaust gases 16 flowing through the exhaust line 18 and entering the first SCR catalyst 20 (i.e., the first temperature T1). The first temperature T1 may also refer to the temperature of the exhaust gases 16 flowing through the first SCR catalyst 20. In step 102, the first temperature sensor 34 may continuously monitor the first temperature T1 and sends the first temperature signal 36 to the control module 26. In response, the control module 26 stores the first temperature T1 in the memory 30. Alternatively, the first temperature T1 may be extracted from a look up table or model stored on the control module 26.

The method 100 then continues to step 104. Step 104 entails determining a temperature of the exhaust gases 16 flowing in the exhaust line 18 and entering the second SCR catalyst 22 (i.e., the second temperature T2). The second temperature T2 may also refer to the temperature of the exhaust gases 16 flowing through the second SCR catalyst 22. In step 104, the second temperature sensor 38 may continuously monitor the second temperature T2 and sends the second temperature signal 40 to the control module 26. Upon receipt of the second temperature signal 40, the control module 26 stores the second temperature T2 in the memory 30. The method 100 subsequently continues to step 106.

Step 106 entails determining if the engine 12 has performed a cold start. To do so, the control module 26 receives an input signal from the ignition system 13 indicating that the engine 12 has performed a cold start (i.e., the cold start signal 15). If the engine 12 has not performed a cold start, the method 100 continues to step 116. If the engine 12 performed a cold start, the method 100 continues to step 108.

Step 108 entails determining if the first SCR catalyst 20 is operating within an SCR working temperature range. The SCR working temperature range for the first and second SCR catalysts 20, 22 may be between 150 degrees Celsius and 450 degrees Celsius. In order to determine if the first SCR catalyst 20 is operating between the working temperature range, the control module 26 may determine if the temperature of the exhaust gases 16 in the exhaust line 18 and flowing into the first SCR catalyst 20 (i.e., the first temperature T1) falls within the SCR working temperature range (e.g., 150 to 450 degrees Celsius). If the first SCR catalyst 20 is not operating within the working temperature range, the method 100 repeats steps 102-106. If the first SCR catalyst 100 is operating within the SCR working temperature range, the method 100 continues to step 110.

Step 110 entails determining or monitoring the nitrogen oxides concentration in the exhaust gases 16 at a location downstream of the second SCR catalyst 22. To do so, the first nitrogen oxide sensor 50 measures the nitrogen oxides concentration of the exhaust gases 16 after the exhaust gases 16 have passed through the second SCR catalyst 20 and sends an input signal indicating the nitrogen oxides concentration in the exhaust gases 16 downstream of the second SCR catalyst 22 (i.e., the first nitrogen oxides concentration signal 52) to the control module 26. Upon receiving the first nitrogen oxides concentration signal 52, the control module 26 stores the measured nitrogen oxides concentration in the memory 30. Step 110 may be performed after a predetermined amount of time has passed after the engine cold start. After performing step 110, the method 100 then continues to step 111.

Step 111 entails determining or monitoring the nitrogen oxides concentration in the exhaust gases 16 at a location downstream of the engine 12 and upstream of the first SCR catalyst 20. In other words, step 111 includes determining the nitrogen oxides concentration in the exhaust gases 16 before the exhaust gases 16 enter the first SCR catalyst 20. To do so, the second nitrogen oxide sensor 51 measures the nitrogen oxides concentration of the exhaust gases 16 before the exhaust gases 16 enter the first SCR catalyst 20 and sends an input signal indicating the nitrogen oxides concentration in the exhaust gases 16 upstream of the first SCR catalyst 20 (i.e., the second nitrogen oxides concentration signal 53) to the control module 26. Upon receiving the second nitrogen oxides concentration signal 53, the control module 26 stores the measured nitrogen oxides concentration in the memory 30. Step 111 may be performed after a predetermined amount of time has passed after the engine cold start. As discussed above, the nitrogen oxides concentration of the exhaust gases 16 at a location downstream of the engine 12 and upstream of the first SCR catalyst 20 may be obtained from a model executed by the control module 26. After performing step 111, the method 100 then continues to step 112.

Step 112 includes determining if the exhaust system 14 is efficiently converting nitrogen oxides in the exhaust gases 16 into nitrogen and water. In other words, step 112 entails determining the nitrogen oxides conversion efficiency of the exhaust system 14 and comparing this nitrogen oxides conversion efficiency to an efficiency threshold value. The efficiency threshold value may be obtained from a catalyst model executed by the control module 26. To do so, the control module 26 first calculates the SCRs nitrogen oxides conversion efficiency using the following equation:

$$\eta = \frac{\text{NO}x \text{ upstream of 1st } SCR - \text{NO}x \text{ downstream of 2nd } SCR}{\text{NO}x \text{ upstream of 1st } SCR} \cdot 100\%$$ Equation A wherein:

$\eta$ is the nitrogen oxides conversion efficiency of the exhaust system 14;

NOx upstream of 1st SCR is the nitrogen oxide concentration in the exhaust gases 16 before the exhaust gases 16 enter the first SCR catalyst 20 and after the exhaust gases 16 exit the engine 12; and NOx downstream of 2nd SCR is the nitrogen oxides concentration in the exhaust gases 16 that have already passed through the second SCR catalyst 22.

The control module 26 determines if the calculated the nitrogen oxides conversion efficiency of the exhaust system 14 is less than a nitrogen oxides conversion efficiency threshold value. Hence, step 112 entails comparing the calculated the nitrogen oxides conversion efficiency of the exhaust system 14 to a predetermined nitrogen oxides conversion efficiency threshold value. The nitrogen oxides conversion efficiency threshold value may be extracted from a model or look up table and may be determined by testing the engine 12 and the exhaust system 14. If the calculated the nitrogen oxides conversion efficiency of the exhaust system 14 exceeds the nitrogen oxides conversion efficiency threshold value, the method 100 returns to step 102. If the calculated the nitrogen oxides conversion efficiency of the exhaust system 14 is less than the nitrogen oxides conversion efficiency threshold value, the method 100 continues to step 114.

In step 114, the control module 26 identifies the second SCR catalyst 22 as the source of nitrogen oxide conversion inefficiency in the exhaust system 14. In other words, in step 114, the control module 26 identifies the second SCR catalyst 22 as a source of nitrogen oxide reduction inefficiency.

Returning to step 106, if the engine 12 has not performed a cold start but rather the engine 12 was previously running, the method 100 continues to step 116. Step 116 entails determining or monitoring the nitrogen oxides concentration in the exhaust gases 16 at a location downstream of the second SCR catalyst 22. To do so, the first nitrogen oxide sensor 50 measures the nitrogen oxides concentration of the exhaust gases 16 after the exhaust gases 16 have passed through the second SCR catalyst 20 and sends an input signal indicating the nitrogen oxides concentration in the exhaust gases 16 downstream of the second SCR catalyst 22 (i.e., the nitrogen oxides concentration signal 52) to the control module 26. Upon receiving the nitrogen oxides concentration signal 52, the control module 26 stores the measured nitrogen oxides concentration in the memory 30. The method 100 then continues to step 117.

Step 117 entails determining or monitoring the nitrogen oxides concentration in the exhaust gases 16 at a location downstream of the engine 12 and upstream of the first SCR catalyst 20. In other words, step 117 includes determining the nitrogen oxides concentration in the exhaust gases 16 before the exhaust gases 16 enter the first SCR catalyst 20. To do so, the second nitrogen oxide sensor 51 measures the nitrogen oxides concentration of the exhaust gases 16 before the exhaust gases 16 enter the first SCR catalyst 20 and sends an input signal indicating the nitrogen oxides concentration in the exhaust gases 16 upstream of the first SCR catalyst 20 (i.e., the second nitrogen oxides concentration signal 53) to the control module 26. Upon receiving the second nitrogen oxides concentration signal 53, the control module 26 stores the measured nitrogen oxides concentration in the memory 30. As discussed above, the nitrogen oxides concentration of the exhaust gases 16 at a location downstream of the engine 12 and upstream of the first SCR catalyst 20 may be obtained from a model executed by the control module 26. After performing step 117 the method 100 then continues to step 118.

Step 118 includes determining if the exhaust system 14 is efficiently converting nitrogen oxides in the exhaust gases 16 into nitrogen and water. In other words, step 118 entails determining the nitrogen oxides conversion efficiency of the exhaust system 14 and comparing this nitrogen oxides conversion efficiency to a nitrogen oxides conversion efficiency threshold value. The efficiency threshold value may be obtained from a catalyst model executed by the control module 26. To do so, the control module 26 first calculates the SCR's nitrogen oxides conversion efficiency using Equation A. If the calculated the nitrogen oxides conversion efficiency of the exhaust system 14 exceeds the nitrogen oxides conversion efficiency threshold value, the method 100 returns to step 102. If the calculated the nitrogen oxides conversion efficiency of the exhaust system 14 is less than the nitrogen oxides conversion efficiency threshold value, the method 100 continues to step 120.

Step 120 includes determining if the temperature of the exhaust gases 16 flowing through the exhaust line 18 and entering the first SCR catalyst 20 (i.e., the first temperature T1) and the temperature of the exhaust gases 16 through the exhaust line 18 and entering the second SCR catalyst (i.e., the second temperature T2) fall within the SCR working temperature range (e.g., 150 to 450 degrees Celsius) If the first and second temperatures T1, T2 fall within the SCR working temperature range, the method 100 continues to step 122.

In step 122, the control module 26 sends a deactivation signal 48 to the DEF dosing system 42 to disable the DEF dosing system 42. In response to the deactivation signal 48, the DEF dosing system 42 is disabled and thereby stops injecting DEF 44 to the exhaust line 18. Step 122 therefore entails deactivating the DEF dosing system 42 to stop supplying DEF 44 to the exhaust line 18. After deactivating the DEF dosing system 42, the method 100 continuous to step 124.

Step 124 entails determining if the nitrogen oxides concentration rate of increase is greater than a rate threshold value.

The nitrogen oxides concentration rate of increase refers to the increase in nitrogen oxides concentration over time. The rate threshold value may be extracted from a look up table stored in the memory 30 and may be a calibration value. As discussed above, the nitrogen oxides concentration is obtained from the first nitrogen oxide sensor 50. If the nitrogen oxides concentration rate of increase is not greater than the rate threshold value, the method 100 returns to step 102. Conversely, if the nitrogen oxides concentration rate of increase is greater than the rate threshold value, the method 100 continues to step 126. As used herein, the term "rate threshold value" means a predetermined rate of increase of the nitrogen oxide concentration in the exhaust gases 16 exiting the second SCR catalyst 22. The rate threshold value may be used to determine a source of nitrogen oxide reduction inefficiency.

Step 126 entails determining if the first temperature T1 is greater than the second temperature T2. As discussed above, the first temperature T1 refers to the temperature of the exhaust gases 16 flowing through the exhaust line 18 and entering the first SCR catalyst 20, and the second temperature T2 refers to the temperature of the exhaust gases 16 flowing through the exhaust line 18 and entering the second SCR catalyst 22.

If the first temperature T1 is greater than the second temperature T2, then the method 100 continues to step 128. In step 128, the control module 26 identifies the second SCR catalyst 22 as a source of nitrogen oxide reduction inefficiency.

If the first temperature T1 is not greater than the second temperature T2, then the method 100 continues to step 130. In step 130, the control module 26 identifies the first SCR catalyst 20 as a source of nitrogen oxide reduction inefficiency.

Returning to step 120, if the first and second temperatures T1, T2 do not fall within the predetermined SCR working temperature range, the method 100 continues to step 132. Step 132 entails determining if the first temperature T1 is greater than an upper threshold value Tmax. The term "upper threshold value" means a temperature at which the nitrogen oxide conversion performed by the SCR catalyst (20 or 22) is solely dependent on the inlet ammonia concentration in that SCR catalyst (20 or 22). Further, the upper threshold value Tmax may be extracted from the memory 30. For example, the upper threshold value Tmax may be 450 degrees Celsius. The first SCR catalyst 20 is deemed to be hot when the first temperature T1 is greater than the upper threshold value Tmax. At this juncture, the second SCR catalyst 22 has amble storage capacity for ammonia. Step 132 also entails determining if the second temperature T2 falls within a predetermined SCR working temperature range. As a non-limiting example, the predetermined SCR working temperature may range between 150 and 450 degrees Celsius.

If the first temperature T1 is greater than the upper threshold value Tmax and the second temperature T2 falls within the predetermined SCR working temperature range (e.g., 150 to 450 degrees Celsius), the method 100 continues to step 134.

In step 134, the control module 26 sends a deactivation signal 48 to the DEF dosing system 42 to disable the DEF dosing system 42. In response to the deactivation signal 48, the DEF dosing system 42 is disabled and thereby stops injecting DEF 44 to the exhaust line 18. Step 134 therefore entails deactivating the DEF dosing system 42 to stop supplying DEF 44 to the exhaust line 18. After deactivating the DEF dosing system 42, the method 100 continuous to step 136.

Step 136 entails determining if the nitrogen oxides concentration rate of increase is greater than a rate threshold value. The nitrogen oxides concentration rate of increase refers to the increase in nitrogen oxides concentration over time. The rate threshold value may be extracted from a look up table stored in the memory 30 and may be a calibration value. As discussed above, the nitrogen oxides concentration is obtained from the first nitrogen oxide sensor 50. If the nitrogen oxides concentration rate of increase is not greater than the rate threshold value, the method 100 returns to step 102. Conversely, if the nitrogen oxides concentration rate of increase is greater than the rate threshold value, the method 100 continues to step 138. In step 138, the control module 26 identifies the second SCR catalyst 22 as a source of nitrogen oxide reduction inefficiency.

Returning to step 132, if the first temperature T1 is not greater than the upper threshold value Tmax and the second temperature T2 does not fall within the SCR working temperature range (e.g., 150 to 450 degrees Celsius), the method 100 continues to step 140. Step 140 entails determining if the first temperature T1 falls within the SCR working temperature range (e.g., 150 to 450 degrees Celsius) and whether the second temperature T2 is less than a lower threshold value Tmin. The term "lower threshold value" means a temperature, wherein the SCR catalyst (20 or 22) is deactivated and therefore does not convert nitrogen oxides into nitrogen and water. The lower threshold value Tmin may be extracted from the memory 30. For example, the lower threshold value Tmin may be 150 degrees Celsius. The second SCR catalyst 22 is deemed to be cold when the second temperature T2 is less than the lower threshold value Tmin. If the first temperature T1 falls within the SCR working temperature range and the second temperature T2 is less than the lower threshold value Tmin, the method 100 continues to step 142. In step 142, the control module 26 identifies the first SCR catalyst 20 as a source of nitrogen oxide reduction inefficiency. If the first temperature T1 does not fall within the SCR working temperature range and the second temperature T2 is not less than the lower threshold value Tmin, the method 100 returns to step 102.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. As used herein, the phrase at least one of A, B, and C should be construed to mean a logical (A or B or C), using a non-exclusive logical or. It should be understood that steps within a method may be executed in different order without altering the principles of the present disclosure.

The invention claimed is:

1. A method for identifying a source of nitrogen oxides reduction inefficiency in an exhaust system including an exhaust line, first and second selective catalytic reduction (SCR) catalysts of predetermined working temperature range connected in series along the exhaust line, and a diesel exhaust fluid dosing system configured to inject diesel exhaust fluid into the exhaust line, each of the first and second SCR catalysts being configured to convert nitrogen oxides of variable rate concentration into nitrogen and water, the method comprising:

determining, via a first temperature sensor, a first temperature of exhaust gases entering the first SCR catalyst;

determining, via a second temperature sensor, a second temperature of exhaust gases entering the second SCR catalyst;

determining when the first and second temperatures fall within the predetermined SCR working temperature range;

stopping a supply of diesel exhaust fluid (DEF) to the exhaust line when the first and second temperatures fall within the predetermined SCR working temperature range;

determining, via a first nitrogen oxides sensor, a nitrogen oxides concentration in the exhaust gases exiting the second SCR catalyst;

determining, via a second nitrogen oxides sensor, a nitrogen oxides concentration in the exhaust gases entering the first SCR catalyst;

determining, via a control module, a nitrogen oxides conversion efficiency of the exhaust system based on the nitrogen oxides concentration in the exhaust gases exiting the second SCR catalyst and the nitrogen oxides concentration in the exhaust gases entering the first SCR catalyst;

comparing, via the control module, the nitrogen oxides conversion efficiency to a nitrogen oxides conversion efficiency threshold value;

determining, via the control module, which of the first and second SCR catalysts is a source of nitrogen oxides reduction inefficiency based on the first and second temperatures when the nitrogen oxides conversion efficiency is less than the nitrogen oxides conversion efficiency threshold value;

comparing, via the control module, the first temperature to the second temperature to determine when the first temperature is greater than the second temperature;

identifying, via the control module, the second SCR catalyst as the source of nitrogen oxides reduction inefficiency when the first temperature is greater than the second temperature; and identifying, via the control module, the first SCR catalyst as the source of nitrogen oxides reduction inefficiency when the first temperature is not greater than the second temperature.

2. The method of claim 1, further comprising determining when a nitrogen oxides concentration rate of increase is greater than a rate threshold value after stopping the supply of DEF to the exhaust line.

3. The method of claim 2, further comprising determining when the first temperature is greater than the second temperature and whether the nitrogen oxides concentration rate of increase is greater than the rate threshold value.

4. The method of claim 1, further comprising:
determining when the second temperature falls within the predetermined SCR working temperature range; and
determining when the first temperature is greater than an upper threshold value.

5. The method of claim 4, wherein the upper threshold value is 450 degrees Celsius.

6. The method of claim 4, further comprising:
stopping a supply of diesel exhaust fluid (DEF) to the exhaust line when the second temperature falls within the predetermined SCR working temperature range and the first temperature is greater than the upper threshold value; and
determining when a nitrogen oxides concentration rate of increase is greater than a rate threshold value after the supply of DEF to the exhaust line has been stopped.

7. The method of claim 6, further comprising identifying the second SCR catalyst as a source of nitrogen oxides reduction inefficiency when the nitrogen oxides concentration rate of increase is greater than the rate threshold value.

8. The method of claim 1, further comprising:
determining when the first temperature falls within the predetermined SCR working temperature range; and
determining when the second temperature is less than a lower threshold value.

9. The method of claim 8, wherein the lower threshold value is 150 degrees Celsius.

10. The method of claim 9, wherein the predetermined SCR working temperature range is a temperature range between 150 and 450 degrees Celsius.

11. The method of claim 10, further comprising identifying the first SCR catalyst as a source of nitrogen oxides reduction inefficiency when the first temperature falls within the predetermined SCR working temperature range and the second temperature is less than the lower threshold value.

12. The method of claim 1, wherein the predetermined SCR working temperature range is a temperature range between 150 and 450 degrees Celsius.

13. An exhaust system, comprising:
an exhaust line configured to convey exhaust gases;
a first selective catalytic reduction (SCR) catalyst configured to convert nitrogen oxides in the exhaust gases into nitrogen and water;
a second SCR catalyst configured to convert nitrogen oxides in the exhaust gases into nitrogen and water, the first and second SCR catalysts connected in series along the exhaust line;
a first temperature sensor configured to measure a temperature of the exhaust gases entering the first SCR catalyst to determine a first temperature, the first temperature sensor being configured to generate a first temperature signal indicative of the first temperature;
a second temperature sensor configured to measure a temperature of the exhaust gases entering the second SCR catalyst to determine a second temperature, the second temperature sensor being configured to generate a second temperature signal indicative of the second temperature;
a diesel exhaust fluid (DEF) dosing system configured to inject DEF into the exhaust line; and
a control module in communication with the first and second temperature sensors, the control module being configured to:
receive the first and second temperature signals;
command the DEF dosing system to stop injecting DEF into the exhaust line when the second temperature falls within a predetermined SCR working temperature range and the first temperature is greater than an upper threshold value;
determine a nitrogen oxides concentration in the exhaust gases exiting the second SCR catalyst;
determine a nitrogen oxides concentration in the exhaust gases entering the first SCR catalyst;
determine a nitrogen oxides conversion efficiency of the exhaust system based on the nitrogen oxides concentration in the exhaust gases exiting the second SCR catalyst and the nitrogen oxides concentration in the exhaust gases entering the first SCR catalyst;
compare the nitrogen oxides conversion efficiency to a nitrogen oxides conversion efficiency threshold value; and
determine which of the first and second SCR catalysts is a source of nitrogen oxides reduction inefficiency based on the first and second temperatures when the nitrogen oxides conversion efficiency is less than the nitrogen oxides conversion efficiency threshold value compare the first temperature to the second temperature to determine when the first temperature is greater than the second temperature; and identify the first SCR catalyst as the source of nitrogen oxides reduction inefficiency when the first temperature is not greater than the second temperature.

14. The exhaust system of claim 13, wherein the control module is configured to determine when the first and second temperatures fall within an SCR working temperature range.

15. The exhaust system of claim 14, wherein the control module is configured to identify the first SCR catalyst as a source of nitrogen oxides reduction inefficiency when the first temperature falls within the SCR working temperature range and the second temperature is less than a lower threshold value.

16. A vehicle, comprising:

an internal combustion engine configured to produce exhaust gases;

an exhaust line coupled to the internal combustion engine and configured to receive exhaust gases from the internal combustion engine;

a first selective catalytic reduction (SCR) catalyst configured to convert nitrogen oxides in the exhaust gases into nitrogen and water;

a second SCR catalyst configured to convert nitrogen oxides in the exhaust gases into nitrogen and water, the first and second SCR catalysts connected in series along the exhaust line;

a first temperature sensor configured to measure a temperature of the exhaust gases entering the first SCR catalyst to determine a first temperature, the first temperature sensor being configured to generate a first temperature signal indicative of the first temperature;

a second temperature sensor configured to measure a temperature of the exhaust gases entering the second SCR catalyst to determine a second temperature, the second temperature sensor being configured to generate a second temperature signal indicative of the second temperature;

a diesel exhaust fluid (DEF) dosing system configured to inject DEF into the exhaust line; and a control module in communication with the first and second temperature sensors, the control module being configured to:

receive the first temperature signal from the first temperature sensor and record the first temperature;

receive the second temperature signal from the second temperature sensor and record the second temperature;

command the DEF dosing system to stop injecting DEF into the exhaust line when the first and second temperatures fall within a predetermined SCR working temperature range;

determine a nitrogen oxides concentration in the exhaust gases exiting the second SCR catalyst;

determine a nitrogen oxides concentration in the exhaust gases entering the first SCR catalyst;

determine a nitrogen oxides conversion efficiency of the exhaust system based on the nitrogen oxides concentration in the exhaust gases exiting the second SCR catalyst and the nitrogen oxides concentration in the exhaust gases entering the first SCR catalyst;

compare the nitrogen oxides conversion efficiency to a nitrogen oxides conversion efficiency threshold value;

determine which of the first and second SCR catalysts is a source of nitrogen oxides reduction inefficiency based on the first and second temperatures when the nitrogen oxides conversion efficiency is less than the nitrogen oxides conversion efficiency threshold value;

compare the first temperature to the second temperature to determine when the first temperature is greater than the second temperature; and identify the first SCR catalyst as the source of nitrogen oxides reduction inefficiency when the first temperature is not greater than the second temperature.

17. The vehicle of claim 16, wherein the control module is configured to identify the first SCR catalyst as a source of nitrogen oxides reduction inefficiency when the first temperature falls within an SCR working temperature range and the second temperature is less than a lower threshold value.

* * * * *